(12) United States Patent
Johnston

(10) Patent No.: US 7,168,376 B2
(45) Date of Patent: Jan. 30, 2007

(54) SEED BOOT FOR A SEEDING MACHINE

(75) Inventor: Mark Johnston, Geneseo, IL (US)

(73) Assignee: Deere & Company, Moline, IL (US)

( * ) Notice: Subject to any disclaimer, the term of this patent is extended or adjusted under 35 U.S.C. 154(b) by 233 days.

(21) Appl. No.: 10/632,370

(22) Filed: Aug. 1, 2003

(65) Prior Publication Data
US 2005/0022706 A1  Feb. 3, 2005

(51) Int. Cl.
*A01C 7/00* (2006.01)
(52) U.S. Cl. ............................ 111/167; 111/150
(58) Field of Classification Search ........... 111/163, 111/167, 170, 186, 18, 81, 150, 154
See application file for complete search history.

(56) References Cited
U.S. PATENT DOCUMENTS

| | | | |
|---|---|---|---|
| 5,092,255 A | 3/1992 | Long et al. | 111/167 |
| 5,850,790 A * | 12/1998 | Salte | 111/149 |
| 6,032,593 A | 3/2000 | Wendling et al. | 111/187 |
| 6,059,047 A * | 5/2000 | Schimke | 172/769 |
| 6,178,901 B1 * | 1/2001 | Anderson | 111/197 |
| 6,209,466 B1 | 4/2001 | Wodrich | 111/189 |
| 6,363,871 B1 * | 4/2002 | Puetz et al. | 111/152 |
| 6,640,731 B1 * | 11/2003 | Rowlett et al. | 111/152 |
| 6,745,709 B2 * | 6/2004 | Rowlett et al. | 111/152 |

\* cited by examiner

*Primary Examiner*—Victor Batson

(57) ABSTRACT

An integral cast seed boot is provided with a mounting assembly for securing the seed boot to a planting unit frame. A single furrow opener disc is rotatively mounted to the planting unit frame by a bearing assembly. The seed boot defines a seed entry passage having an inlet for receiving seed from a seed meter and an outlet for depositing metered seed into a seed planting furrow formed by the furrow opener. The seed inlet is located in front of the mounting assembly. The seed entry passage slopes continuously and uniformly downwardly and rearwardly from the inlet to the outlet. The outlet is located below the bearing assembly of the furrow opener disc.

13 Claims, 2 Drawing Sheets

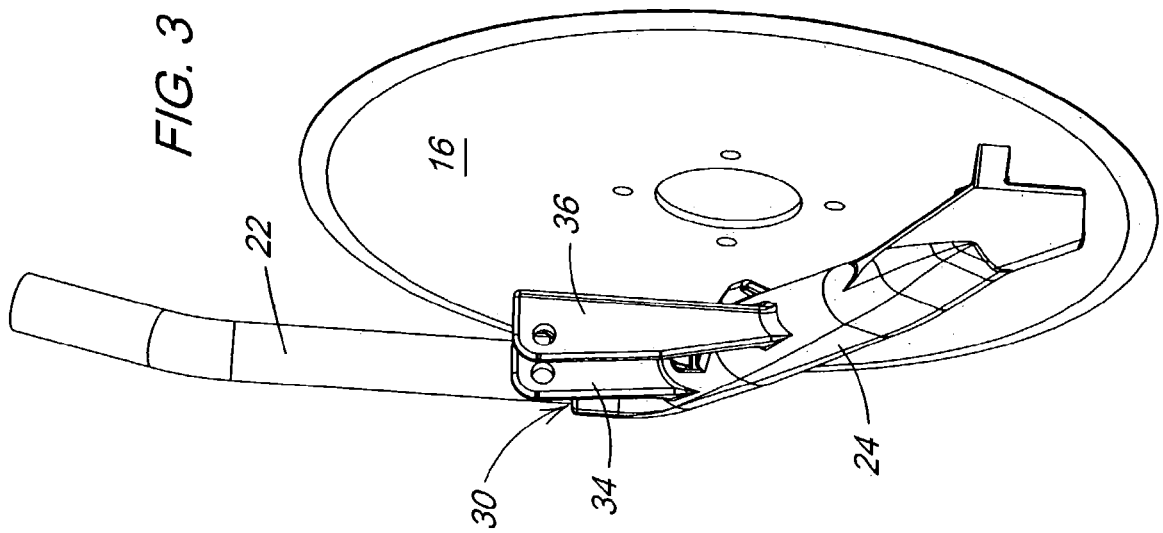
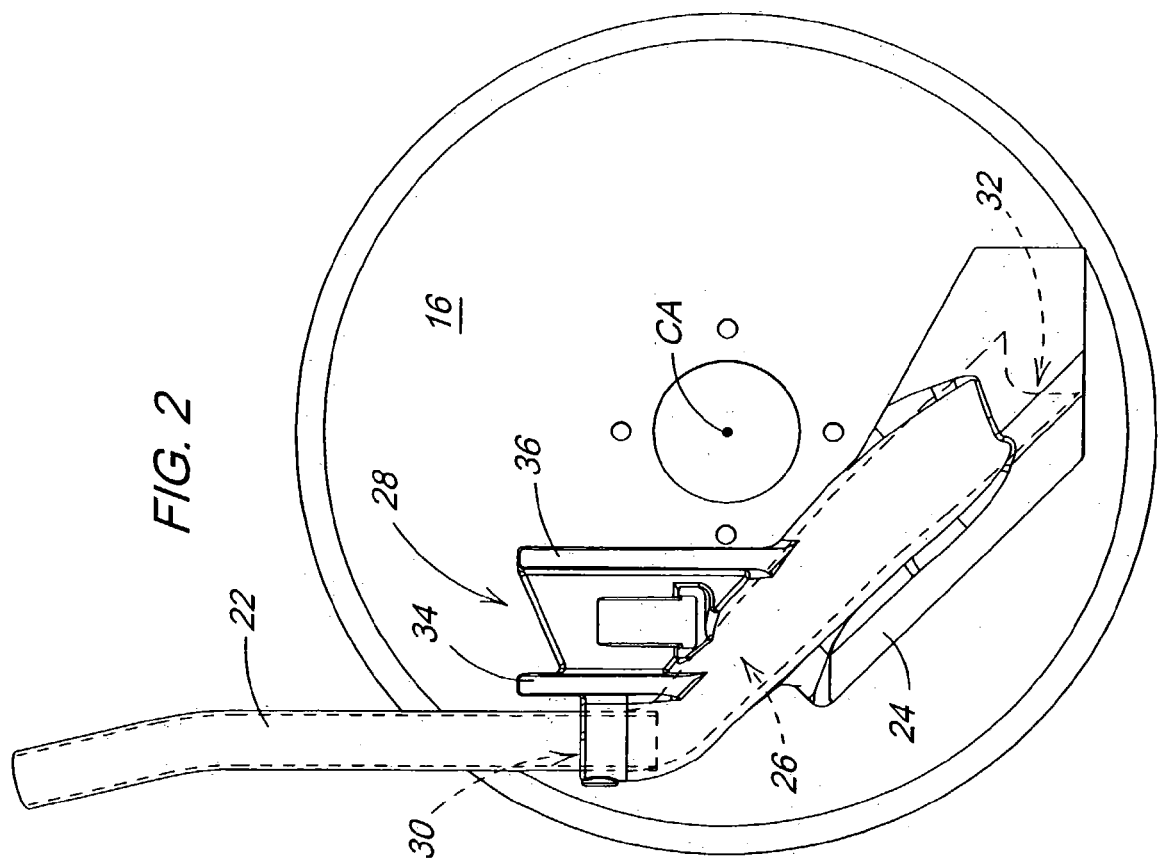

SEED BOOT FOR A SEEDING MACHINE

FIELD OF THE INVENTION

The present invention is directed to a seed boot for a seeding machine, having an elongated seed entry passage.

BACKGROUND OF THE INVENTION

Grain drills and air seeders are seeding machines for solid planting a crop. More specifically, the seeding rows are so close together as to prevent cultivation and/or other cultural practices. The seed is kept in a large hopper which supplies a plurality of seed meters. An individual seed meter is associated with each planting unit. The seed meter in turn directs the metered seed through a seed tube to a seed boot having a seed entry passage. The seed entry passage is sloped rearwardly to impart a rearward velocity component on the seed relative to the forward motion of the seeding machine. A furrow opener forms a planting furrow immediately in front of the seed boot. The seed boot lies adjacent the furrow opener in its shadow. The seed entry passage directs the seed into the planting furrow which is closed by a furrow closing wheel.

U.S. Pat. Nos. 5,092,255 and 6,209,466 are examples of a grain drill having a single disc opener and a seed boot. The furrow opener forms the planting furrow while the seed boot maintains the planting furrow open as the seed is being introduced.

SUMMARY OF THE INVENTION

It is an object of the present invention to provide a seed boot having an elongated and more gently sloping seed entry passage.

The present invention comprises an integral cast seed boot having a mounting assembly for securing the seed boot to the planting unit frame. A single furrow opener disc is rotatively mounted to the planting unit frame by a bearing assembly. The furrow opener disc is located adjacent to the seed boot for forming the planting furrow. The seed boot together with the furrow opener disc maintains the planting furrow until the seed is deposited in the planting furrow. The seed boot defines a seed entry passage having an inlet for receiving seed from a seed meter and an outlet for depositing metered seed into a seed planting furrow. The seed inlet is located in front of the mounting assembly. The seed entry passage extends downwardy and rearwardly from the inlet. The outlet is located below the bearing assembly of the furrow opener disc.

BRIEF DESCRIPTION OF THE DRAWINGS

FIG. 2 is a side view of the seed boot, seed tube and furrow opener disc.

FIG. 3 is a perspective rear view of the seed boot, seed tube and furrow opener disc.

DETAILED DESCRIPTION

Figure 1:
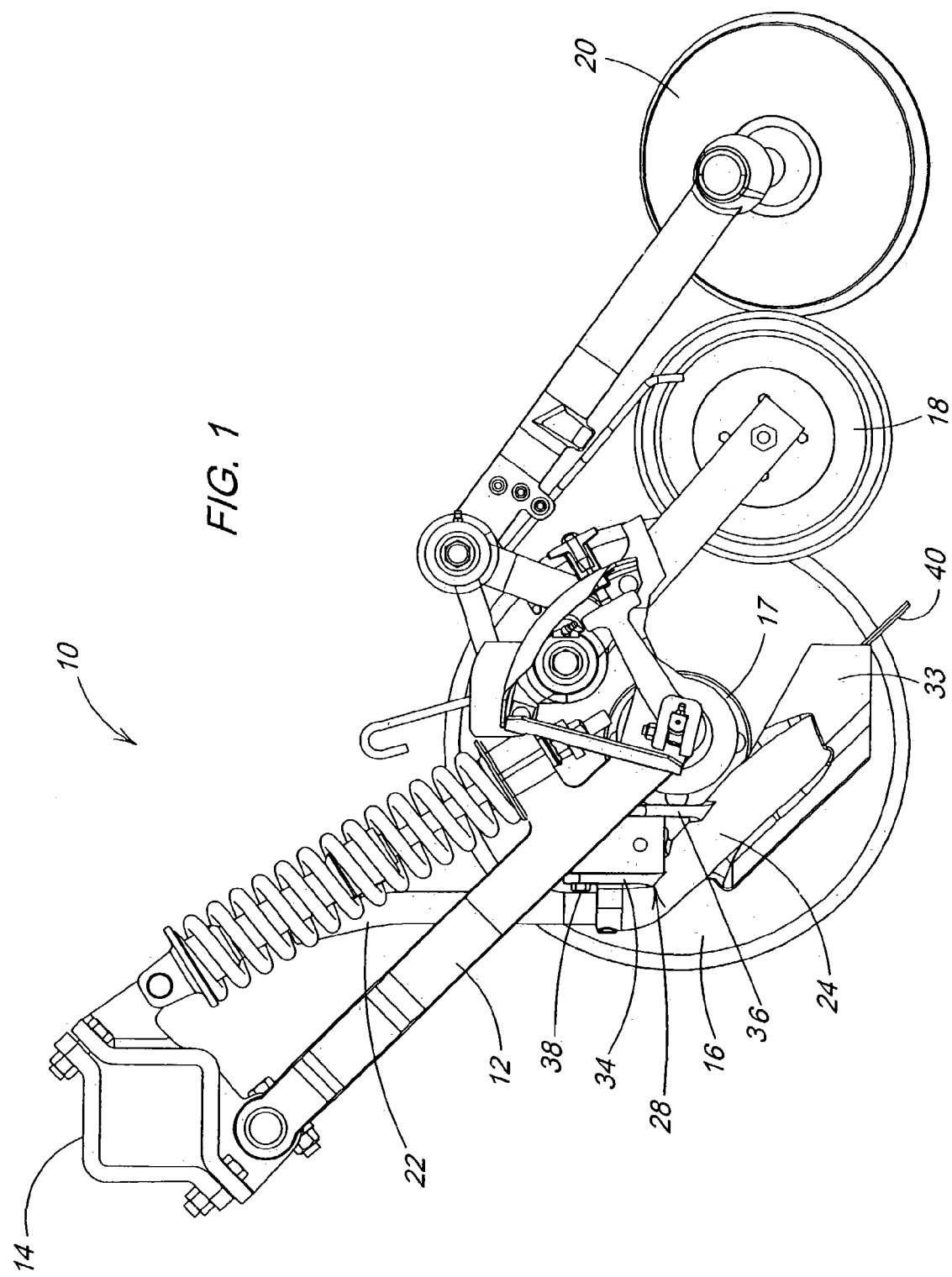
FIG. 1 is a side view of an individual planting unit for a seeding machine.

FIG. 1 discloses an individual planting unit 10 for a seeding machine. The planting unit has a pivotal planting unit frame 12 that is coupled to the seeding machine frame by clamping structure 14. A single disc furrow opener 16 is rotatively coupled to the frame 12 by a bearing assembly 17. The furrow opener 16 forms a planting furrow into which the metered seed is deposited. A seed lock wheel 18 is rotatively mounted to the frame 12 and is located behind the furrow opener 16 for pressing seeds into the planting furrow. Immediately behind the seed press wheel 18 is the closing wheel 20 for collapsing the planting furrow and covering the seeds with a loose layer of soil.

Metered seed from the seeding machine is directed to seed tube 22 which directs it downwardly into seed boot 24. The seed boot 24 comprises an integral cast part having a seed entry passage 26 and a mounting assembly 28. The seed entry passage 26 has an inlet 30 and an outlet 32 illustrated in phantom lines in FIG. 2. The inlet 30 is located in front of the mounting assembly 28 and above the center axis CA of the bearing assembly 17. The inlet 30 comprises a cylindrical hole for receiving the seed tube 22. The outlet 32 is located below the center axis CA of the bearing assembly 17. As such the slope of the seed entry passage slopes continuously and uniformly downwardly and rearwardly from the inlet 30 located in front of the mounting assembly 28 to the outlet 32 located behind and below the mounting assembly 28. As the seed exists the outlet 32 it contacts the bottom of the planting furrow and is located between seed boot sidewall 33 and the furrow opener 16.

The mounting assembly 28 comprises a clevis having front wing 34 and rear wing 36 through which a mounting bolt 38 passes securing the seed boot 24 to the planter frame 12. The inlet 30 is located adjacent to and in front of the front wing 34.

A plastic seed flap 40 is mounted to the seed boot 24 by a mounting screw, not shown.

In operation as the planting unit 10 is pulled through a field the furrow opener 16 forms a planting furrow. Metered seed is passed by the seed tube 22 to the seed boot 24. The entry seed passage 26 directs the metered seed downwardly and rearwardly to the planting furrow. The seed flap 40 prevents the seed from bouncing out of the planting furrow and the seed is pressed into the bottom of the planting furrow by seed lock wheel 18. Closing wheel 20 collapses the planting furrow covering the seed with a loose layer of soil.

The shadow of a single disc furrow opener is small and by locating the inlet of the seed entry passage in front of the mounting assembly the present invention provides a longer and more gradual slope for the seed entry passage.

Having described the illustrated embodiment it will become apparent that various modifications can be made without departing from the scope of the invention as defined in the accompanying claims.

The invention claimed is:

1. A seed boot for a seeding machine comprising an integral cast body having a seed entry passage extending downwardly and rearwardly from an inlet to an outlet, an integral mounting assembly for mounting the seed boot to a planting unit frame is located above the seed entry passage, the inlet is located in front of the mounting assembly and the outlet is located below and behind the mounting assembly wherein the mounting assembly comprises a clevis having a front wing and a rear wing.

2. The seed boot as defined by claim 1 wherein the seed entry passage slopes continuously and uniformly downwardly and rearwardly from the inlet to the outlet.

3. The seed boot as defined by claim 1 wherein the inlet is in front of and adjacent to the front wing.

4. The seed boot as defined by claim 3 wherein the seed boot is provided with an integral sidewall immediately downstream from the outlet.

5. The seed boot as defined by claim 4 wherein the seed boot is provided with a seed flap extending downstream from the outlet.

6. A planting unit for a seeding machine, the planting unit comprising:
   a planter unit frame;
   a furrow opener disc rotatively mounted to the planter unit frame by a bearing assembly, the bearing assembly defining a center axis;
   a seed boot is mounted to the planting unit frame by a mounting assembly, the seed boot having a seed entry passage extending downwardly and rearwardly from an inlet to an outlet, the inlet is located in front of the mounting assembly and the outlet is located below the center axis wherein the mounting assembly comprises a clevis having a front wing and a rear wing.

7. The planting unit as defined by claim 6 wherein the mounting assembly is located in front of the bearing assembly.

8. The planting unit as defined by claim 7 wherein the seed entry passage slopes continuously and uniformly downwardly and rearwardly from the inlet to the outlet.

9. The planting unit as defined by claim 6 wherein the seed boot is secured to the planting unit frame by a mounting bolt passing through the clevis.

10. The planting unit as defined by claim 9 wherein the inlet is in front of and adjacent to the front wing.

11. The planting unit as defined by claim 10 wherein the seed boot is provided with an integral sidewall immediately downstream from the outlet.

12. The planting unit as defined by claim 11 the seed boot is provided with a seed flap extending downstream from the outlet.

13. The planting unit as defined by claim 6 wherein the seed boot is a cast integral part.

\* \* \* \* \*